(12) United States Patent
Kassubek et al.

(10) Patent No.: US 12,134,569 B2
(45) Date of Patent: Nov. 5, 2024

(54) DIELECTRIC BARRIER DISCHARGE FOR BALLAST WATER TREATMENT USING OPTIMIZED VOLTAGE SHAPE CONTROL

(71) Applicant: ABB Schweiz AG, Baden (CH)

(72) Inventors: Frank Kassubek, Rheinfelden (DE); Jan Carstensen, Waldshut-Tiengen (DE); Seila Rodriguez-Vilches, Thalwil (CH); Torsten Votteler, Niederrohrdorf (CH); Enea Bianda, Baden (CH)

(73) Assignee: ABB Schweiz AG, Baden (CH)

( * ) Notice: Subject to any disclaimer, the term of this patent is extended or adjusted under 35 U.S.C. 154(b) by 655 days.

(21) Appl. No.: 17/298,183

(22) PCT Filed: Dec. 13, 2019

(86) PCT No.: PCT/EP2019/085087
§ 371 (c)(1),
(2) Date: May 28, 2021

(87) PCT Pub. No.: WO2020/120741
PCT Pub. Date: Jun. 18, 2020

(65) Prior Publication Data
US 2022/0119275 A1    Apr. 21, 2022

(30) Foreign Application Priority Data
Dec. 14, 2018   (EP) ..................................... 18212652

(51) Int. Cl.
*C02F 1/00*    (2023.01)
*C02F 1/46*    (2023.01)
*C02F 103/00*  (2006.01)

(52) U.S. Cl.
CPC ............ *C02F 1/008* (2013.01); *C02F 1/4608* (2013.01); *C02F 2103/008* (2013.01);
(Continued)

(58) Field of Classification Search
CPC .. C02F 1/008; C02F 1/4608; C02F 2103/008; C02F 2201/46; C02F 2209/36;
(Continued)

(56) References Cited

U.S. PATENT DOCUMENTS 8,422,253 B2 *  4/2013  Chang ............... H02M 3/33523
                                                363/21.16
9,868,653 B2    1/2018  Denvir et al.
(Continued)

FOREIGN PATENT DOCUMENTS

CN    101990354 A    3/2011
CN    104853513 A    8/2015
(Continued)

OTHER PUBLICATIONS

European Office Action; Application No. 19816798.3; Completed: Aug. 18, 2022; 5 Pages.
(Continued)

*Primary Examiner* — Ekandra S. Miller-Cruz
(74) *Attorney, Agent, or Firm* — Whitmyer IP Group LLC

(57) ABSTRACT

A Dielectric Barrier Discharge system controller for controlling a fluid treatment by a Dielectric Barrier Discharge system is provided. Therein, the strength of an effect caused by a discharge created by the Dielectric Barrier Discharge system is monitored, and the generation of high-voltage pulses by the high-voltage pulse generator is controlled. The controlling of the generation of the high-voltage pulses is adapted based on the received sensor data.

20 Claims, 7 Drawing Sheets

(52) U.S. Cl.
CPC ...... *C02F 2201/46* (2013.01); *C02F 2209/36* (2013.01); *C02F 2209/40* (2013.01); *C02F 2209/44* (2013.01); *C02F 2303/04* (2013.01); *C02F 2305/023* (2013.01)

(58) Field of Classification Search
CPC .............. C02F 2209/40; C02F 2209/44; C02F 2303/04; C02F 2305/023; C02F 2201/46125; C02F 2201/4613; C02F 2201/46135; C02F 2209/001; C02F 2209/005; C02F 1/487
USPC ................................................. 210/748.01
See application file for complete search history.

(56) References Cited

U.S. PATENT DOCUMENTS

| | | | |
|---|---|---|---|
| 2003/0146310 A1* | 8/2003 | Jackson | A62D 3/20 239/690 |
| 2008/0315689 A1 | 12/2008 | Medvedev | |
| 2011/0297844 A1 | 12/2011 | Vecziedins et al. | |
| 2012/0033459 A1 | 2/2012 | Chang et al. | |
| 2017/0313603 A1 | 11/2017 | Fraser et al. | |

FOREIGN PATENT DOCUMENTS

| | | |
|---|---|---|
| CN | 107253786 A | 10/2017 |
| WO | 2015024601 A1 | 2/2015 |

OTHER PUBLICATIONS

Chinese Office Action and Search Report; Application No. 2019800818995; Completed: Aug. 30, 2022; 20 Pages.
International Search Report and Written Opinion of the International Searching Authority; Application No. PCT/EP2019/085087; Completed: Jan. 27, 2020; Mailing Date: Feb. 3, 2020: 13 Pages.
Extended European Search Report; Application No. 18212652.4; Completed: May 10, 2021; Issued: May 17, 2019; 7 Pages.

* cited by examiner

Modeling of unipolar pulses.

Modeling of unipolar pulses.

Modeling of bipolar pulses.

Modeling of bipolar pulses.

DIELECTRIC BARRIER DISCHARGE FOR BALLAST WATER TREATMENT USING OPTIMIZED VOLTAGE SHAPE CONTROL

TECHNICAL FIELD

Embodiments of the present disclosure generally relate to the field of water treatment. In particular, the present disclosure provides methods and devices for the treatment of ballast water with a Dielectric barrier discharge using voltage pulses.

BACKGROUND

Cruise ships, large tankers, and bulk cargo carriers use a tremendous amount of ballast water, which is often taken on in the coastal waters in one region after ships discharge wastewater or unload cargo, and discharged at the next port of call, wherever more cargo is loaded. Ballast water discharge typically contains a variety of biological materials, including plants, animals, viruses, and other microorganisms. These materials often include non-native, nuisance, exotic species that can cause extensive ecological and economic damage to aquatic ecosystems.

To decontaminate such ballast water, Dielectric Barrier Discharge Systems are used. Dielectric barrier discharges (DBD) are known in industrial applications for the generation of reactive chemical species, like chemical radicals, that can be used, among others, for disinfection and cleaning of surfaces or liquids.

In a discharge volume in a DBD plasma reactor, an interaction between accelerated charged particles (i.e. electrons and ions) and other chemical species (i.e., atoms, molecules and radicals) takes place. With DBDs, gases and liquids are treated by oxidation, using a non-thermal plasma for creating active species as excited molecules, radicals or ozone.

Typically, Dielectric barrier discharges, as it may be used for ballast water treatment, may be operated with fixed voltage pulse shapes for gas/liquid treatment.

There are two main types of voltage waveforms used for the generation of active species in a plasma reactor in a DBD system: 1. Commonly used for commercial applications is a slow sinusoidal ac waveform with frequencies between 10 Hz and 10,000 Hz 2. A pulse train shaped waveform consisting of short, preferably rectangular shaped voltage pulses with a fast rise-time (<100 ns). This kind of waveform is relatively unknown in the use of DBD reactors. DBD reactors may be operated at high voltages in the range of 1 kV to 100 kV.

It is known that using short pulses for the conversion of electrical energy into active species is more efficient compared to an operation with a standard low-frequency AC voltage. Furthermore, in appropriate conditions, additional to the discharge at the rising edge of the pulse, a second discharge at the falling edge of the pulse can be observed. This phenomenon is known as back discharge.

In particular, adapting characteristics of the pulses during treatment of the fluids/gases can further improve the efficiency of generation of active species.

Therefore, more effective solutions for generating pulses and active species in DBD plasma reactors may be appreciated. It is the objective of this invention to provide a sensor-based control method that optimizes the pulse shape and pulse sequence during operation to increase the overall system efficiency.

SUMMARY

In order to address at least some of the foregoing and other potential problems, embodiments of the present disclosure propose:

In a first aspect, a Dielectric Barrier Discharge system controller for controlling a fluid treatment by a Dielectric Barrier Discharge system is disclosed. The controller comprises a control unit and a monitoring system. The monitoring system comprises one or more sensor devices configured to monitor the strength of an effect caused by a discharge created by the Dielectric Barrier Discharge system, and to transmit sensor data indicative of the strength of the effect to the control unit. The control unit is operatively coupled to a high-voltage pulse generator of the Dielectric Barrier Discharge system for controlling the generation of high-voltage pulses by the high-voltage pulse generator. The control unit is configured to adapt the controlling of the generation of the high-voltage pulses (controlling of properties of the pulses such as pulse power, pulse shape, pulse duration, pulse repetition rate, sequence of pulse types) based on the received sensor data.

The strength of an effect caused by a discharge created by the Dielectric Barrier Discharge system can be, for example, at least one of an amount of plasma (which also includes the monitoring of the presence of plasma and/or of an intensity relating to the presence and/or amount of plasma), a current flow, a voltage, an amount of a charge, chemical agents, a flow of a fluid or a biological status or a time duration of a discharge or equivalently, of a quantity indicative of one of the above. For example, a sensor measuring an intensity of electromagnetic radiation emitted by the plasma is a sensor device monitoring the amount (presence and intensity) of the plasma. The effect can also be indirectly measured, e.g., by a measurement of the occurrence of a discharge (e.g., by measurement of a discharge, such as the arcing current or a quantity indicative thereof). The monitored strength is a quantity indicative of the output (effect created by) the Dielectric Barrier Discharge system, and not merely of an input to the Dielectric Barrier Discharge system such as the input power.

Thus, according to an aspect of the invention, a Dielectric Barrier Discharge system controller for controlling a fluid treatment by a Dielectric Barrier Discharge system is provided. Therein, the strength of an effect caused by a discharge created by the Dielectric Barrier Discharge system is monitored, and the generation of high-voltage pulses by the high-voltage pulse generator (110) is controlled. The controlling of the generation of the high-voltage pulses is adapted based on the received sensor data.

Data, which are received from the sensors devices may be processed in the control unit. The control unit may be in communication with the monitoring system. The control unit may also be in communication with a power supply (DC voltage supply) which is considered to be a portion of the high-voltage pulse generator. The control unit may be in communication with other parts of the high-voltage pulse generator. Further, the control unit may be configured to adapt high voltage pulses, generated by the high-voltage pulse generator in the DBD system such, that a treated fluid has a predetermined status (properties of the plasma, e.g., as expressed for example by the monitored quantities, such as amount of plasma). In this manner, a feedback loop control of the plasma status can be established.

In another aspect, a control unit is disclosed. The control unit may be in communication with the monitoring system according to any of the previous claims and be adapted to analyse signals from the monitoring system which are related to a monitored system status.

In another aspect, a method for optimizing pulses in a DBD system is disclosed. The method may comprise to monitor one or more status values of at least one of a plasma, a current flow, a voltage, a charge, chemical agents, a flow of a fluid or a biological status or a time duration of a discharge and an input power into the plasma reactor. The method may further comprise to adjust parameters of at least one of a DC Power supply, a pulse generator, a fluid system dependent on the monitored status or data of the monitored status.

In another aspect, a DBD system is disclosed, with a controller and a monitoring system according to one or more aspects of the present application.

In another aspect, a method for operating a DBD system is disclosed, comprising: monitoring, with one or more sensor devices a fluid, treated with the DBD system; inputting data from the one or more sensor devices representing a status of the treated fluid, into a control unit; processing, in the control unit, status data of the treated fluid; adapting parameters of a high-voltage pulse generator, which feeds high-voltage pulses in the DBD system, with the control unit, to generate pulses to achieve a predetermined status of the treated fluid.

BRIEF DESCRIPTION OF DRAWINGS

Embodiments of the present disclosure will be presented in the sense of examples and their advantages may be explained in greater detail below, with reference to the accompanying drawings, wherein.

DETAILED DESCRIPTION

Figure 1:
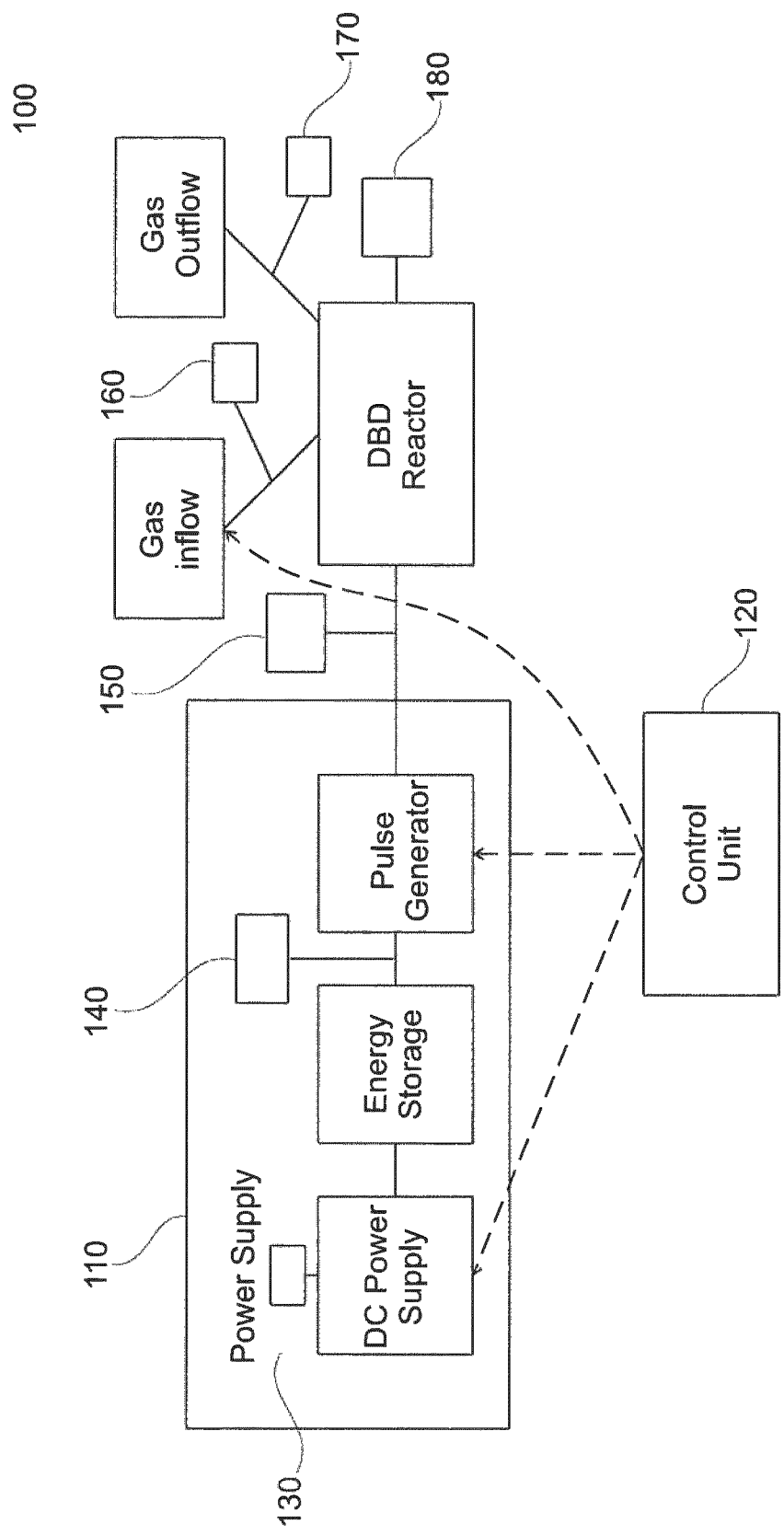
FIG. 1 shows a sketch of the general setup of a system described in the application.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase may be intended to have a special meaning, i.e., a meaning other than that understood by skilled artisans, such a special definition will be expressly set forth in the specification in a definitional manner that directly and unequivocally provides the special definition for the term or phrase.

When generating active species from fluids in a Dielectric Barrier Discharge (DBD) system, in particular gases like oxygen ($O_2$), nitrogen ($N_2$) or environmental air (78% vol % $N_2$, 21 vol $O_2$) are used. By the energy of a plasma, generated in the DBD, the gases are converted into reactive gases (radicals, active species), like ozone ($O_3$) from oxygen ($O_2$), nitrogen oxides (NOx) from a mixture of oxygen and nitrogen.

Current commercial DBD systems (gas treatment, ozonizers) may use a slow AC voltage. It may be however well known that rectangular voltage pulses with small rise-time (~100 ns) and short duration (<1 us) are more efficient with respect to energy due to the higher field, accelerating the streamer.

But not only simply using rectangular short pulses increases the efficiency of active species generation. It turned out, that changing the characteristics of the short pulses has an advantageous effect on the efficiency of species generation.

In some cases, advantageously the repetition frequency of the short pulses may be adapted to the treatment need to positively influence the generation of species.

Furthermore, for very short pulses, a charge deposited on the dielectric during a rising edge of the pulse may generate a second "back discharge" on the falling edge of the pulse, which may increase the efficiency. This "memory effect" implies that each pulse or discharge influences the next discharge.

Figure 4:
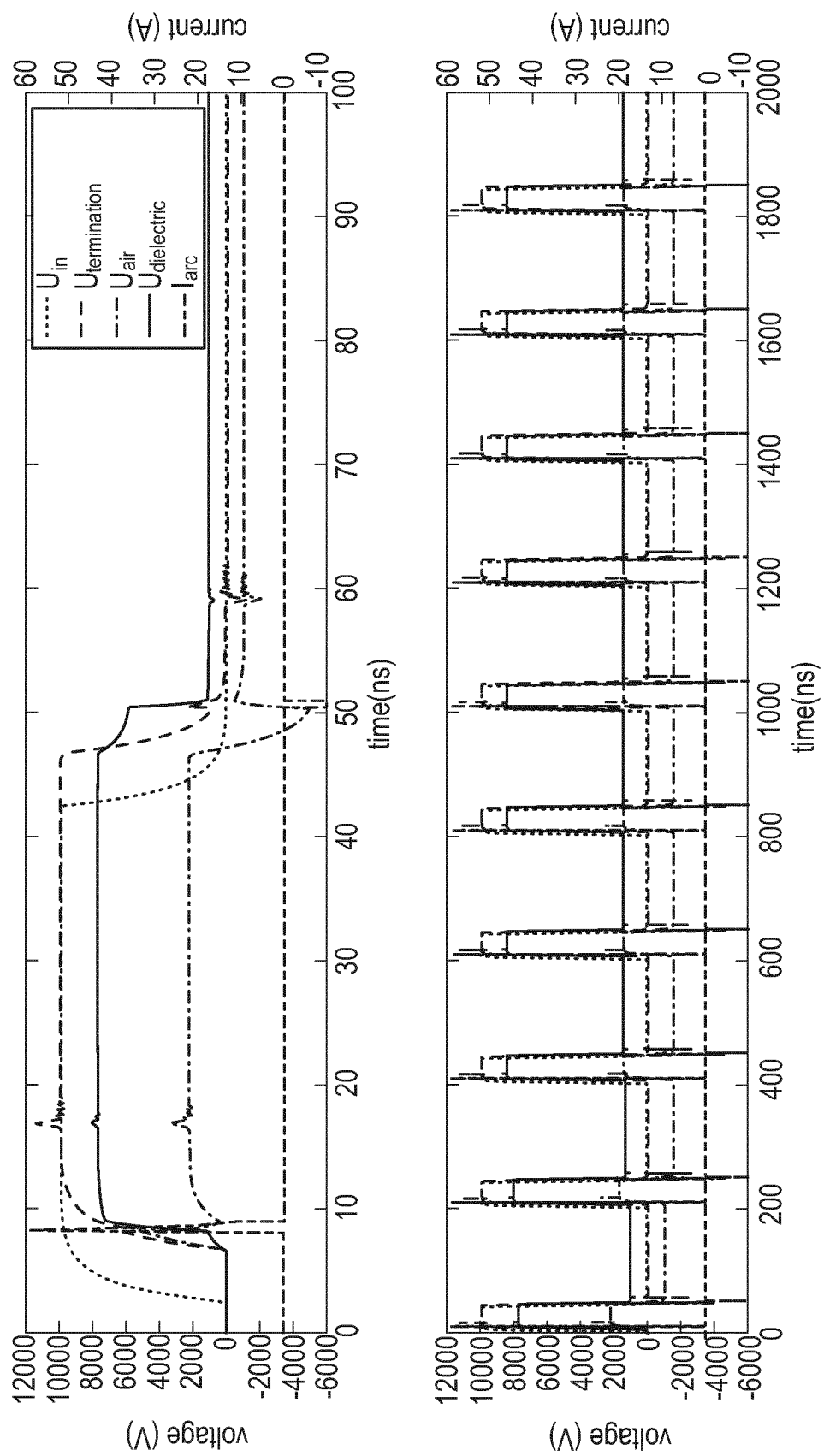
FIG. 4 shows a modeling of unipolar pulses according to embodiments of the present application.
Figure 6:
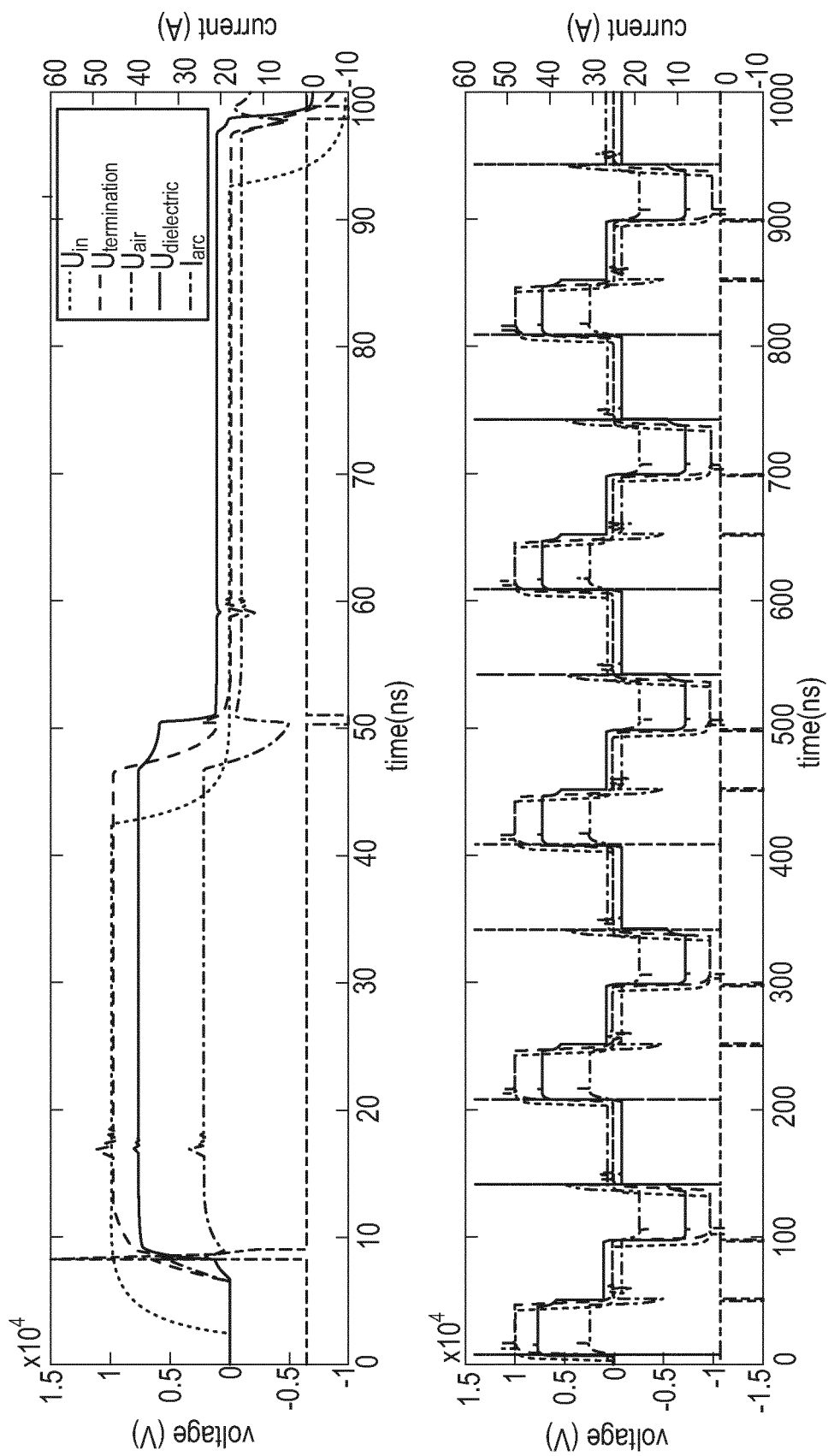
FIG. 6 shows a modeling of bipolar pulses according to embodiments of the present application.

For pulsed discharges, the controller may in particular ensure an occurrence of a back discharge at the falling edge of the pulse. To this purpose, at least one of the sensor devices can be configured to monitor the occurrence (and time) of a back discharge. The control unit may then for example adapt, based on the received sensor data indicative of the back discharge (arcing event), a pulse control signal (e.g., controlling a pulse voltage, pulse frequency, pulse length, and/or time between pulses) so that a back discharge overlaps with the falling edge of the pulse. The lower diagrams in FIGS. 4 and 6 show this back-discharge. The upper diagrams in FIGS. 4 and 6 show the necessary voltages, the controller (and the pulse generator) has to supply. Back charges occur only above a specific voltage limit.

The generated high-voltage pulses are, according to a preferred aspect, a pulse sequence of multiple pulses. In a preferred aspect, the pulse sequence comprises bursts of pulses with a shorter interval between the pulses, wherein multiple bursts of pulses are separated by a longer interval between the bursts. Both the pulse frequency within the bursts and the time interval between the bursts can be adapted by the control unit based on the received sensor data.

The pulses may be essentially rectangular pulses with an identifiable rising edge at the beginning of a pulse and a falling edge at the end of the pulse, as illustrated in FIGS. 4-7.

It is therefore proposed, among other effects of the application, to provide a controller for a pulse generator, preferably for a DBD system, that may adapt a pulse shape and a pulse sequence in real-time in order to optimize the system performance, especially to lower an energy consumption and increase efficiency of generated active species.

The controller may use sensor measurements which may characterize the process in real-time and then can react accordingly e.g. adjusting the maximum voltage of the pulse to the instant of occurrence of the discharge.

A setup for a solution is shown in FIG. 1. One or multiple sensors are used to observe system state of a system 100. The sensors may comprise sensors capable of optically detecting plasma, current, voltage and charge sensors, an input power, flow, chemical, biological sensors in the gas (or liquid) in- and outflows of the system 100.

A control unit 120 may comprise circuitry to analyse signals from the sensors to sense a system status. The control unit may in particular be arranged to change and adapt continuously the parameters/control signals for DC power supply, pulse generator and gas/liquid system. The controller may be configured to change and adapt any other parameter in any part of the system.

The control unit 120 may e.g. be adapted to optimize the voltage/current shapes applied to the Dielectric Barrier Discharge system. This can be done in order to optimize an energy consumption of the system or to adapt to changing environmental parameters (e.g. pollutant concentration, temperature, gas humidity).

Figure 2:
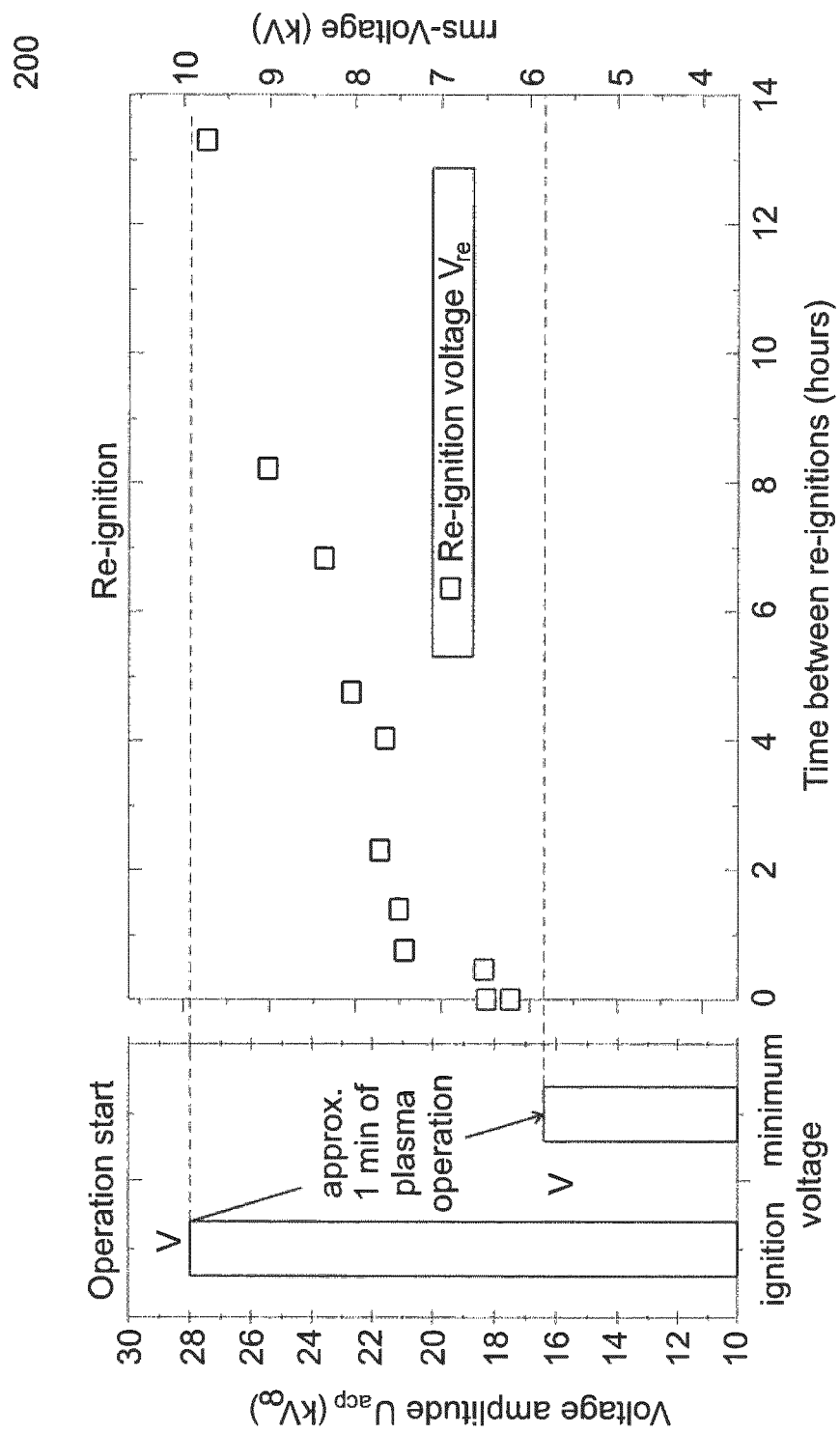
FIG. 2 shows a dependence of ignition voltage of a discharge on history.

Specifically from FIG. 2 it can be seen, that with time between the re-ignition, the voltage strongly increases as charges on the dielectric diffuse away. Therefore, an online control of the applied voltage to match the minimal ignition voltage as close as possible, can strongly reduce energy consumption.

Preferably, the system may hold settings in a range that guarantees the additional back discharge at the end of each pulse as shown in FIGS. 4 and 6. Upper graph in FIG. 4 shows a desired behavior for unipolar pulses: at these voltage parameters, discharges occur at the rising and falling edge.

Upper graph in FIG. 6 shows a similar observation as for unipolar pulses: an optimized configuration shows discharges at each rising and falling edge.

After detection of a discharge in the rising edge, the remaining rise-time (and maximal voltage) of the pulse can be adapted to the exact instant of the discharge (one may also use similar information from preceding pulses).

Models describing the system can be used for model predictive control as well as neural nets, historic databases or AI (artificial intelligence) methods for predicting and optimizing the discharge behavior.

The length of the pulse or, if possible with a generator used in the system, also the rise-time can be adapted. Beyond the form of a single pulse also the repetition frequency and especially the sequence of pulses with positive and negative polarity is continuously adjusted (e.g. it may be beneficial depending on the charge on the dielectric to repeat pulses with the same polarity before a change to the opposite polarity).

Therefore, in an embodiment of the present application, a monitoring system is disclosed. The monitoring system adapted to monitor a status of a fluid, treated with a Dielectric Barrier Discharge (DBD) system or, in other words, monitor the operational status of DBD-based fluid treatment system.

The monitoring system may further comprise one or more sensors devices 140, 150, 160, 170, 180, the sensors devices 140, 150, 160, 170, 180 are configured to monitor at least one of a plasma, an input power, a current flow, a voltage, a charge, chemical agents, a flow of a fluid or a biological status or a time duration of a discharge.

The sensors devices 140, 150, 160, 170, 180 are configured to output data, according to their measured values. The data, received from the sensors devices 140, 150, 160, 170, 180 may be processed in a control unit 120. The control unit may contain processing elements like a processing unit, memory and input/output capability. The control unit is configured to adapt high voltage pulses, generated by a high-voltage pulse generator (110) in the DBD system such, that the treated fluid has a predetermined status.

In other words, the control unit may be able, with an algorithm, run by the processing unit, to optimize, based on the sensor data from the sensor devices, pulse characteristics like voltage, polarity, pulse duration (length of the pulse), frequency, rise-times and fall-times.

FIG. 1 shows an exemplary arrangement of a DBD system with a control unit according to the present application. The control unit 120 uses information of the sensor devices 140, 150, 160, 170, 180. Further, the control unit 120 is adapted to change settings of power supply 130, pulse generator and gas flow or pressure. In principle also changes of the DBD reactor geometry are possible. E.g. in a plate to plate reactor system one may vary the distance between the plates (e.g. with a system similar to a screw gauge or with piezos).

The sensors at the different positions may comprise 140, 150 current and voltage, 180 light emission (from discharges in the gap between the electrodes where plasma is generated), temperature, sound, Electric-field strength, 170, 160 temperature, pressure, flow, conductivity, ozone, treatment efficiency, humidity, TRO, TOC, . . . 130 input power (or voltage, current).

Item 110 represents the pulse generating unit. It comprises a DC power supply, in electrical communication with an energy storage. The energy storage is in electrical communication with a pulse generator. The energy storage may comprise a capacitor or a transmission line. The pulse generator may also be provided in form of a transmission line.

The pulse generating unit may be configured for generating short, preferably rectangular shaped voltage pulses. A rectangular shape may be defined by a fast rise-time of <100 ns. The pulse generating unit may be configured (controlled) for generating a train of a plurality of voltage pulses, e.g., with a defined repetition rate and frequency. The voltage pulses may be arranged in a sequence (e.g., a first number $ns \geq 1$ of shorter voltage pulses, followed by a second number $nl \geq 1$ of longer voltage pulses and/or of voltage pulses with longer spaces therebetween, or a first number $nh \geq 1$ (typically 1) of pulses with high voltage amplitude followed by a second number $nl \geq 1$ of pulses with lower voltage amplitude). The sequence may be repeated. The number of pulses and/or of repetitions of the voltage pulses may be at least 10.

In other words, the Dielectric Barrier Discharge system controller according to one or more embodiments of the disclosure may be adapted to adjust or adapt one or more parameters of the pulses in the pulse sequence. The parameters may comprise (this is not considered to be limiting) one or more parameters of the group: a voltage amplitude, a rise-n time, a polarity, a pulse length, a repetition of pulses, a pulse-pause relation.

The transmission line may be provided in the form of a coaxial cable with a predetermined characteristic wave impedance and predetermined length.

The pulse generator may be an electronic switching device with semiconductors, capable of supplying pulses with predetermined and adjustable characteristics (e.g. rise-time).

The pulse generator may also be a first transmission line, in electrical communication with a transmission line used as an energy storage. A switching unit (not shown in FIG. 1) may connect the transmission line used as a storage with the transmission line, which can output the pulse.

The switching unit may be adapted to connect the energy storage to the transmission line, when a predetermined voltage level in the storage has been reached. A control unit 120 is in communication with the DC voltage supply, the pulse generator and a gas inflow of the DBD reactor. The control unit can receive measured data from these devices. E.g. from the gas-inflow, the control unit 120 can receive data of flowing gas volume, gas temperature, gas humidity.

In the following, different variants for the solution described in the present application are disclosed.

A voltage amplitude of the high-voltage pulse can be adjusted by the control unit. A high voltage guarantees the occurrence of a discharge at large energy losses (scaling proportional to voltage squared). However, the minimum required ignition voltage depends on the history of the discharge—see FIG. 2. The control unit 120 may therefore be adapted to continuously estimate the ignition voltage and adjust the pulse voltage accordingly. Preferably the controller may add a "safety" margin above the estimated voltage to ensure ignition.

In a further variant, a time is measured. The time represents the time, a discharge in the plasma reactor occurs. The time can be sensed via e.g. a light emission or current measurements. The measurement may be performed by the controller. The controller may further be adapted to directly adjust the voltage pulse: The rise of the voltage may be stopped and the maximal voltage is not larger than required—energy is saved. The controller may be in a data communication with the DC power supply to enable adjustment of the voltage.

Figure 3:
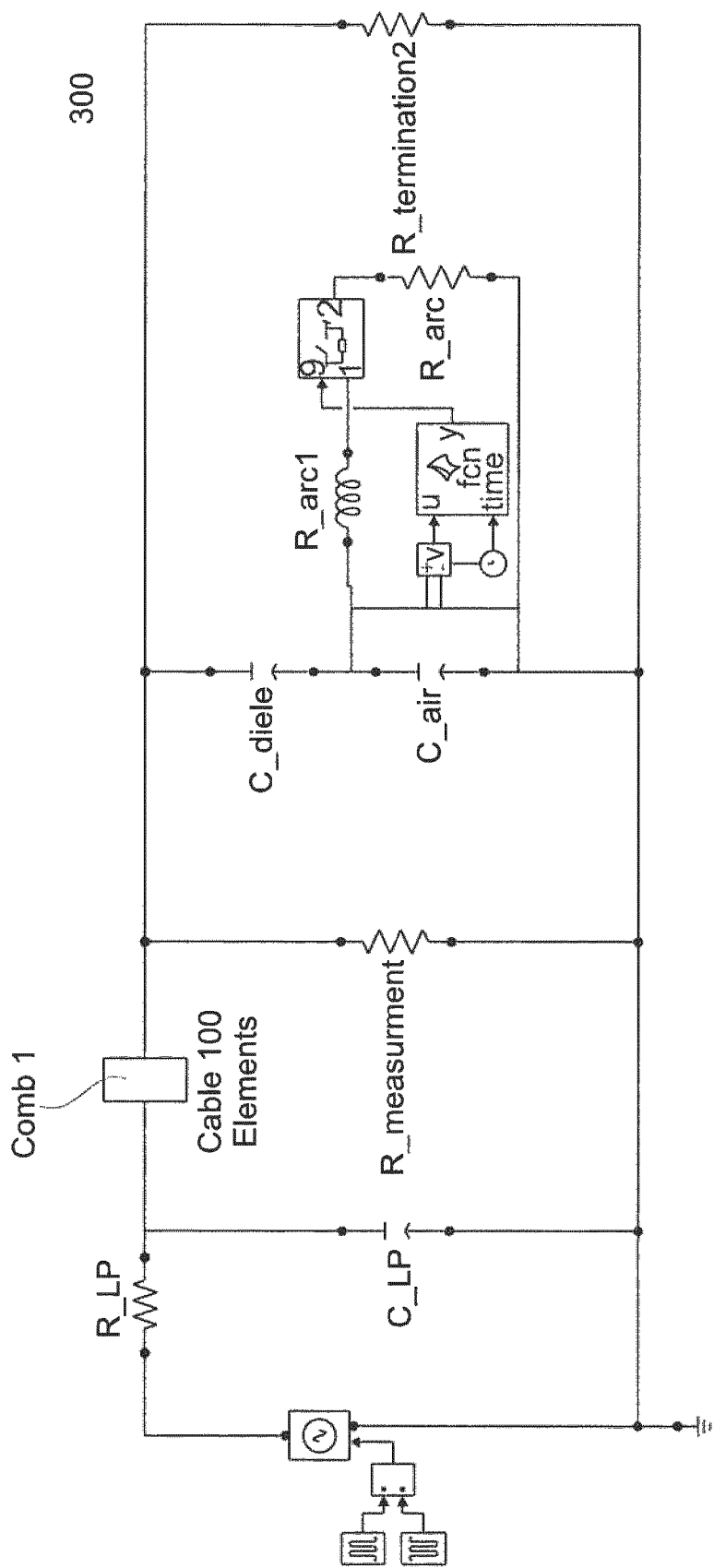
FIG. 3 shows a Simulink model for a DBD barrier discharge with attachment to a power supply.

In another variant, a behavior of the discharge in the plasma reactor can be modeled. For this, equivalent SPICE models as shown in FIG. 3 can be used. This modelling allows for a preliminary estimation, how a controller, built according to the model in FIG. 3 behaves. FIGS. 4 to 7 shows modeled voltages according to different voltage levels and show, when back-discharge occurs.

Figure 5:
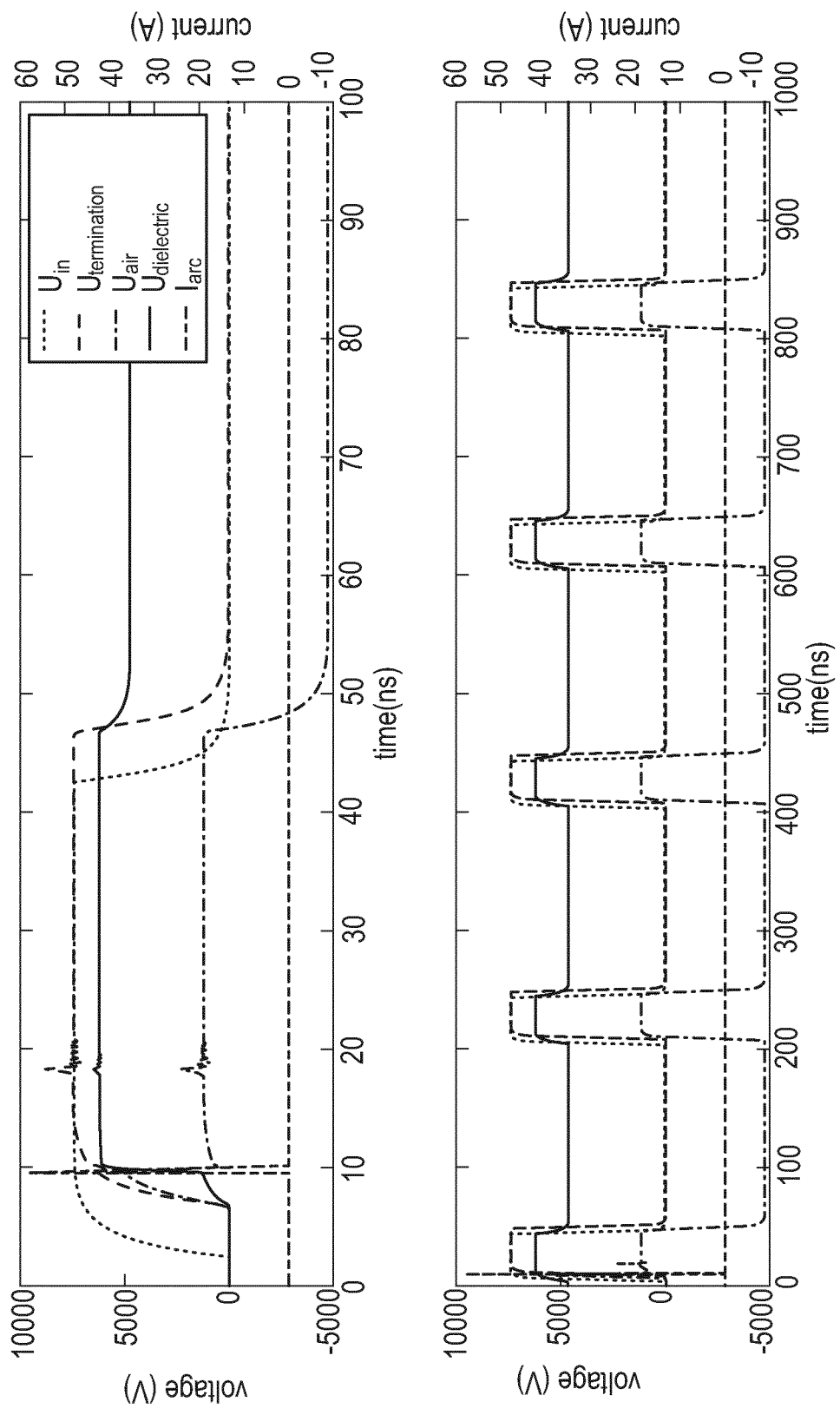
FIG. 5 shows a modeling of unipolar pulses.

FIGS. 1 and 5 show exemplary the modeling of unipolar pulses.

FIG. 4 shows that, with these voltage parameters, discharges occur at rising and falling edge. It is the goal, that controller 120 maintains the system in the configuration as shown in FIG. 4.

In FIG. 5 the voltages are not chosen appropriately. Only a single discharge occurs at the rising edge. It can even happen, that the following pulses do not show discharges due to charge deposited on the dielectric. This is a behavior which should be avoided by the controller 120.

Figure 7:
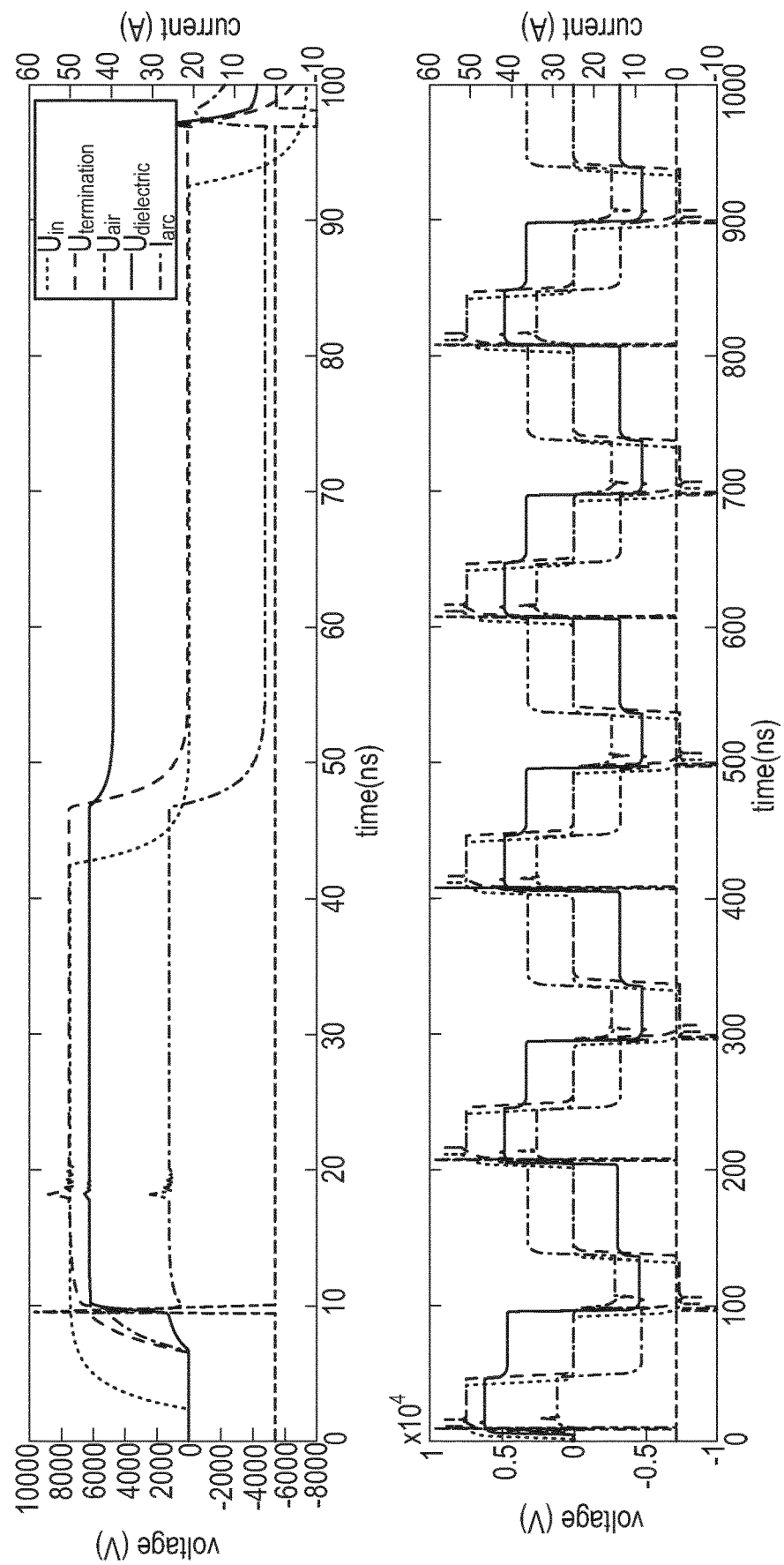
FIG. 7 shows a modeling of bipolar pulses.

FIGS. 6 and 7 shows exemplary modeling of bipolar high-voltage pulses.

FIG. 6, Similar shows an optimized configuration with discharges at each rising and falling edge. FIG. 7 shows a configuration with discharges only at the rising edges (for both polarities). It is the goal, that controller 120 maintains the system in the configuration as shown in FIG. 6.

In case there is a discharge at rising and falling edge, the height of the voltage pulse is at 10 kV, respectively −10 kV at bipolar voltage pulses.

A voltage below (about 7.5 kV, −7.5 kV as can be seen in FIGS. 5 and 7), does not produce the desired back discharges.

For a concentric electrode the geometry may be asymmetric and discharges with different polarity (e.g. the discharge on the rising and falling edge) may differ and have different onset voltages.

The controller 120 is configured to predict a charge on the dielectric in each instant and change a maximal voltage to ensure the back discharge (see FIGS. 4 to 7). The controller 120 can further be configured to change the planned polarity of the next pulse, e.g. repeating pulses of the same polarity in a system with typically alternating polarity.

Similarly, based on respective models, historic measurements or by simple parameter variation, the controller may be adapted to adjust and adapt a rise-time of a pulse (e.g. by switching inductors into the system). Depending on which active species are desired, it may be helpful to control the plasma process (by the rise-time) to preferentially produce certain reactions.

The controller 120 in the disclosed application may also allow for a black box optimization of relevant parameters influencing the pulse shape. This may be done based on a treatment output and a measured energy consumption. E.g a biological status may be a measure for adapting relevant parameters. Parameters are adjusted and pulses are generated as long as a biological status states living organisms.

In another embodiment of the present application, a monitoring system according to one or more aspects is disclosed, wherein at least one of the one or more sensor devices 140, 150, 160, 170, 180 for monitoring a plasma is an optical sensor, adapted to optically detect the plasma. The optical sensor may be configured to sense the presence of a plasma.

In another embodiment of the present application, a monitoring system according to one or more aspects is disclosed, wherein the biological status comprises detecting living organisms in the fluid, the fluid in- and outflowing in the DBD system.

For the treatment of ballast water, it is important to know, if the treatment with the active species is successful, meaning to know, if organisms have been deactivated. For this reason, a biological status is determined which is a measure for the success. Depending on an output of such a measurement, the controller, if necessary, can adapt different parameters of the pulse generating unit 110.

The advantageous effect is, that the system can be supplied only with the energy needed, to deactivate the organisms currently contained in the ballast water. It can adapt parameters such, that only species (amount and kind) are generated, which deactivate a specific kind of organisms.

This optimization may save huge amounts of energy and fluids to be activated (gases like $O_2$, $N_2$).

In another embodiment of the present application, a control unit 120 is disclosed. The control unit 120 may be in electrical and/or data communication with the monitoring system according to any of the previous claims and may further be adapted to analyse signals from the monitoring system which are related to the monitored system status.

The control unit may be configured as a data processing unit and may contain all parts necessary to fulfill these objectives, e.g. memory, one or more processing units, data storage and an algorithm with which the signal from the monitoring system may be processed.

The control unit 120 may further comprise output/input circuitry to transmit/receive data, e.g. to the DC-voltage supply, to adapt parameters of the DC-voltage supply.

Control unit and monitoring system may be provided as stand-alone units or as an integral system. One or both of Control unit 120 or monitoring system may be an integral part of the pulse generating unit 110.

The control unit may be further configured to adapt parameters of a high voltage pulse generator or a fluid system.

In another embodiment of the present application, a control unit 120 according to aspects of the application is disclosed, wherein parameters, which can be adapted by the control unit 120 comprise one or more parameters of the group: a voltage amplitude of a high-voltage pulse, a length (duration) of a high-voltage pulse, a rise-time of a high-voltage pulse, a repetition frequency of a high-voltage pulse.

The control unit 120 according to aspects of the application may be configured to command the high-voltage pulse generator to emit a single pulse or a pulse sequence. Pulses may contain pulses with only one polarity (positive or negative polarity). Pulses may also comprise pulses with changing polarities. A positive pulse may follow a negative pulse. Diagrams with such pulses are shown in FIGS. 6 and 7. Switching polarities of the pulses may improve the efficiency of the treatments.

In a further embodiment, a method for optimizing pulses in a DBD system is disclosed. The method may comprise the monitoring of one or more status values of at least one of a plasma, a current flow, a voltage, an input power, a charge, chemical agents, a flow of a fluid or a biological status or a time duration of a discharge. The method may further comprise to adjust parameters of at least one of a DC Power supply, a high voltage pulse generator, a fluid system, based on the status values. For the fluid system, volumes of gas-flow (gas to be activated by the plasma reactor in the DBD system) or volumes of treated fluids, like ballast water, may be adapted by changing parameters. Gas-flow, treated fluid and activated species have to be in a specific relation. Optimizing this relation by controlling the parameters by the present application increases energy efficiency. An amount of generated active species has to match the needs of the treated fluid.

The status values give a good indication, how effective the treatment is. E.g. the parameters can be adjusted such, that an optimum amount of energy is provided to generate active species, what may improve the effectiveness of the treatment. Only the actual needed pulse energy has to be delivered by the pulse generator.

In a further embodiment, a method for optimizing pulses in a DBD system according to one or more aspects of the application is disclosed, wherein the parameters comprise one or more parameters of the group: a voltage amplitude of a pulse, a length (duration) of a pulse, a rise-time of a pulse, a repetition frequency of a pulse.

In a further embodiment of the present application, a DBD system is disclosed, with a controller and a monitoring system according to any of the preceding claims. The DBD system may further be operatively connected to a network interface for at least one of carrying out a command received from a data network and sending device status information to the data network. In a further embodiment of the present application.

The network interface may further be configured to transceive digital signal/data between the DBD system and the data network, wherein the digital signal/data include operational command and/or information about the DBD System or the network and further comprises a processing unit for converting the signal into a digital signal or processing the signal. The network interface may be located in the monitoring system or the control system.

The network interface gives the advantage to control the DBD system from remote. In case, the system is arranged in a ship for treating ballast water, the status of the system can be controlled. Maintenance from remote may also be possible.

An operating method for a DBD system, in particular operating a plasma reactor in the DBD system may be further disclosed.

The operating method may comprise: monitoring a fluid, treated with the DBD system, with one or more sensor devices 140, 150, 160, 170, 180. Data from the one or more sensor devices 140, 150, 160, 170, 180, representing a status of the treated fluid, may be inputted into a control unit 120. The control unit 120 may be adapted to process status data of the treated fluid, the status data may be received from the sensor devices.

The control unit 120 is further configured to adapt parameters of a high-voltage pulse generator. The high-voltage pulse generator feeds high-voltage pulses in the DBD system. The high-voltage pulses, adapted by the control unit, may achieve a predetermined status of the treated fluid. The sensors devices 140, 150, 160, 170, 180 may be further configured to monitor at least one of a plasma, an input power, a current flow, a voltage, a charge, chemical agents, a flow of a fluid or a biological status or a time duration of a discharge.

The biological status may comprise detecting living organisms in the treated fluid. According to the detection of living organisms, treatment parameters can be adapted by the control unit such that proper active species can be generated which can deactivate the living organisms.

In general, according to the previous disclosure, apparatuses and methods for an improved ballast water treatment with a Dielectric Barrier Discharge have been disclosed.

It turned out, that it is better to use substantially rectangular shaped high-voltage pulses for generating active species from fluids with a plasma in a Dielectric Barrier Discharge system than sinusoidal signals. It turned in particular out, that a generation of active species can be improved by altering characteristics of the high-voltage pulse itself.

The present application discloses therefore to optimize a treatment result with active species by adapting the high voltage pulses in the plasma reactor of a DBD system. The status of e.g. the ballast water, treated with the active species is monitored. According to the monitored status, a control unit calculates and adapts parameters for the high-voltage pulses. The pulses may be adapted in terms of rise-time, voltage level, polarity, pulse duration (length of pulse) and frequency (number of pulses per time unit).

Further, features illustrated or described as part of one embodiment can be used on or in conjunction with other embodiments to yield yet a further embodiment. It is intended that the description includes such modifications and variations.

While the foregoing is directed to embodiments of the disclosure, other and further embodiments of the disclosure may be devised without departing from the basic scope thereof, and the scope thereof is determined by the claims that follow.

The invention claimed is:

1. A controller for controlling a fluid treatment by a Dielectric Barrier Discharge system, the controller comprising: a control unit and a monitoring system, the monitoring system including one or more sensor devices, the one or more sensor devices being configured to monitor the strength of an effect caused by a discharge created by the Dielectric Barrier Discharge system, and to transmit sensor data indicative of the strength of the effect to the control unit, wherein the one or more sensor devices are configured to monitor at least one of an amount of generated plasma, a current flow, a voltage, a charge, chemical agents, a flow of a fluid, a time duration of a discharge, and a biological status of a discharge, wherein the biological status includes detecting living organisms in the fluid inflowing and outflowing in the Dielectric Barrier Discharge system, wherein the control unit is configured to be operatively coupled to a high-voltage pulse generator of the Dielectric Barrier Discharge system for controlling the generation of high-voltage pulses by the high-voltage pulse generator, wherein at least one of the one or more sensor devices is configured to monitor an occurrence of a back discharge, and wherein the control unit uses the sensor data to adapt a pulse control signal configured to adjust the Dielectric Barrier Discharge system so that a back discharge overlaps with a falling edge of at least one of the high-voltage pulses.

2. The controller according to claim 1, wherein at least one of the one or more sensor devices for monitoring a plasma is an optical sensor, adapted to optically detect the amount of the generated plasma.

3. The controller according to claim 1, wherein the control unit is in communication with the monitoring system and adapted to analyze signals from the monitoring system which are related to a system status of the Dielectric Barrier Discharge system.

4. The controller according to claim 1, wherein the control unit is further configured to adapt parameters of at least one of a DC Power supply, a high voltage pulse generator, a fluid system.

5. The controller according to claim 4, wherein the parameters comprise one or more parameters of the group: a voltage amplitude of a pulse, a length or duration of a pulse, a rise-time of a pulse, a repetition frequency of a pulse.

6. The controller according to claim 5, wherein the high-voltage pulses are a single pulse or a pulse sequence.

7. The controller according to claim 6, wherein the control unit is configured to adapt parameters of one or more pulses in the pulse sequence, wherein the parameters comprise one or more of the group: a voltage amplitude, a rise-time, a polarity, a pulse length, a repetition of pulses, a pulse-pause relation.

8. The controller according to claim 6, wherein the pulse sequence comprises pulses with changing polarities.

9. A Dielectric Barrier Discharge system, comprising the controller according to claim 1, and the high-voltage pulse generator.

10. A method of treating a fluid by a Dielectric Barrier Discharge system, the method comprising: controlling, via a control unit, a generation of high-voltage pulses by a high-voltage pulse generator of the Dielectric Barrier Discharge system; creating, by the high-voltage pulses, a discharge by the Dielectric Barrier Discharge system affecting the fluid; monitoring, via one or more sensor devices, the strength of an effect caused by the discharge and generating sensor data indicative of the strength of the effect, wherein the one or more sensor devices are configured to monitor at least one of an amount of generated plasma, a current flow, a voltage, a charge, chemical agents, a flow of a fluid, a time duration of a discharge, and a biological status of a discharge, wherein the biological status includes detecting living organisms in the fluid inflowing and outflowing in the Dielectric Barrier Discharge system, wherein at least one of the one or more sensor devices is configured to monitor an occurrence of a back discharge; and adapting the controlling of the generation of the high-voltage pulses based on the sensor data, wherein the control unit uses the sensor data to adapt a pulse control signal configured to adjust the Dielectric Barrier Discharge system so that a back discharge overlaps with a falling edge of at least one of the high-voltage pulses.

11. The method according to claim 10, the method being used for optimizing the high voltage pulses for a plasma reactor in the Dielectric Barrier Discharge system, wherein the monitoring the strength of the effect includes monitoring one or more status values of at least one of a plasma, a current flow, a voltage, a charge, chemical agents, a flow of a fluid or a biological status or a time duration of a discharge, and wherein the adapting of the controlling includes adjusting with a control unit, based on the status values, parameters of at least one of a DC Power supply, a pulse generator, a fluid system.

12. The method according to claim 11, wherein the parameters comprise one or more parameters of the group: a voltage amplitude of a pulse, a length/duration of a pulse, a rise-time of a pulse, a repetition frequency of a pulse.

13. The method of claim 10, wherein: the monitoring the strength of the effect includes monitoring, with the one or more sensor devices, a fluid, treated with the Dielectric Barrier Discharge system, and the adapting of the controlling includes: inputting data from the one or more sensor devices, representing a status of the treated fluid, into a control unit; processing, in the control unit, status data of the treated fluid; and adapting parameters of a high-voltage pulse generator, which feeds high-voltage pulses in the Dielectric Barrier Discharge system, with the control unit, to generate pulses to achieve a predetermined status of the treated fluid.

14. The method for operating a Dielectric Barrier Discharge system according to claim 13, wherein the sensors devices are configured to monitor at least one of a plasma, an input power, a current flow, a voltage, a charge, chemical agents, a flow of a fluid or a biological status or a time duration of a discharge.

15. The method for operating a Dielectric Barrier Discharge system according to claim 14, wherein the biological status comprises detecting living organisms in the treated fluid.

16. The method for operating a Dielectric Barrier Discharge system according to claim 13, wherein the treated fluid is ballast water.

17. The controller according to claim 1, wherein the control unit adapts a pulse shape and a pulse sequence of the high-voltage pulses in real-time to optimize energy consumption of the Dielectric Barrier Discharge system.

18. A controller for controlling a fluid treatment by a Dielectric Barrier Discharge system, the controller comprising:
- a control unit and a monitoring system,
- the monitoring system including one or more sensor devices,
- the sensor devices being configured to monitor the strength of an effect caused by a discharge created by the Dielectric Barrier Discharge system, and to transmit sensor data indicative of the strength of the effect to the control unit,
- wherein the control unit is configured to be operatively coupled to a high-voltage pulse generator of the Dielectric Barrier Discharge system for controlling the generation of high-voltage pulses by the high-voltage pulse generator,
- wherein at least one of the one or more sensor devices is configured to monitor an occurrence of a back discharge,
- wherein the control unit uses the sensor data to adapt a pulse control signal configured to adjust the Dielectric Barrier Discharge system so that a back discharge overlaps with a falling edge of at least one of the high-voltage pulses,
- wherein the control unit is configured to estimate an ignition voltage and adjust the pulse voltage of the high-voltage pulses based on the estimated ignition voltage.

19. The controller according to claim 18, wherein the control unit is configured to adjust the pulse voltage with a margin added above the estimated ignition voltage.

20. The controller according to claim 18, wherein the control unit is configured to predict a charge on the dielectric in each instant and change a maximal voltage to ensure the back discharge.

* * * * *